Patented Dec. 18, 1951

2,579,295

UNITED STATES PATENT OFFICE 2,579,295

METHOD OF PREPARING 7-DEHYDRO-STEROLS AND ESTERS

Jan Anne Keverling Buisman, Eindhoven, Netherlands, assignor to Hartford National Bank and Trust Company, Hartford, Conn., as trustee No Drawing. Application April 28, 1947, Serial No. 744,530. In the Netherlands June 5, 1946

5 Claims. (Cl. 260—397.2)

The invention relates to a method of preparing 7-dehydrosterols and esters, more particularly of preparing 7-dehydrocholesterol, a compound which is essential as a primary body for vitamin $D_3$ obtained by irradiating it with ultraviolet light.

It is known to produce the substances referred to from a 7-hydroxysterolester by splitting-off the substituent at the 7-position. This involved the problem that the substituent at the 3rd position would not also be split-off, so that products would be obtained which cannot serve as provitamin D.

It has hitherto been necessary to solve this problem by utilizing 7-hydroxysterols esterified at the position 7 (vide for example American Patent Specification 2,098,984 and J. Am. Chem. Soc. 64 1177 (1942)).

In contradistinction thereto the present invention provides a means enabling, in general, the splitting-off of the substituent at the position 7, without splitting-off the substituent at the position 3, by the action of a halide or oxyhalide of an inorganic acid dissolved in a tertiary amine, as a dehydrating means, on a 7-hydroxysterol-3-monoester.

For carrying out the invention use may be made of 7-hydroxysterols, of which, for example, only the hydroxyl group is esterified at the position 3, for example, by means of acetic acid, benzoic acid, stearic acid.

As examples of dehydrating means suitable for carrying out the invention, solutions of, for example, thionyl chloride, sulphuryl chloride, phosphorus oxychloride, phosphorus tribromide, and so forth in tertiary amines, for example, pyridine, pyridine homologues, chinoline, alkylated aniline bases and so forth, or mixtures thereof may be instanced. The yield of 7-dehydrosterolester depends on the nature of the halide or oxyhalide, the nature of the amine, the duration of reaction, the temperature of reaction, and so forth.

The action of the halide (oxyhalide) mixture ensues at an increased temperature, for example, at the boiling point of the amine concerned. The duration of action depends on the halide-amine mixture used, neither excessively short nor excessively long heating leading to the optimum yield due to excessively short time of reaction and decomposition of the 7-dehydrosterolester formed respectively.

The reaction is advantageously performed to the exclusion of oxygen, in order to obviate decomposition of the 7-dehydrosterolester, for example in an atmosphere of nitrogen, hydrogen or the like.

*Examples*

I. A mixture of 50 mgms. of phosphorus oxychloride, 2 ccs. of dimethylaniline, 1 cc. of collidine and 50 mgms. of 7-α-hydroxycholesterol-3-benzoate is boiled for 5 minutes in a nitrogen atmosphere with a free flame. The mixture is then admixed with 15 ccs. of 3% alcoholic potassium and boiled for half an hour, also in a nitrogen atmosphere. Next, the content of sterol that can be precipitated by means of digitonine in the reaction product (51%) is ascertained and the content of 7-dehydrocholesterol (72%) in the sterol-digitonine obtained is ascertained by spectrographic means. The yield of 7-dehydrocholesterol is consequently 37%.

II. 27 mgms. of 7-β-hydroxycholesterol-3-benzoate, 48 mgms. of phosphorus oxychloride, 1 cc. of collidine and 2 ccs. of dimethylaniline are heated together to a boil for 5 minutes in a nitrogen atmosphere. Subsequently, saponification is effected by boiling with alcoholic lye, also in a nitrogen atmosphere (for half an hour). As in Example I, the content of digitonisable sterol and the content of 7-dehydrocholesterol are determined. A yield of sterol of 45% and a content of 7-dehydrocholesterol of 76% are found, so that the yield of 7-dehydrocholesterol is 34% of that theoretically possible.

III. After boiling for 30 minutes a mixture of 50 mgms. of 7-α-hydroxycholesterol-3-benzoate, 50 mgms. of phosphorus oxychloride and 3 ccs. of pyridine in a nitrogen atmosphere, the yield of 7-dehydrocholesterol is ascertained, as in Example I and is found to be 3% of the theoretical yield.

IV. After boiling for 30 minutes a mixture of 50 mgms. of 7-α-hydroxycholesterol-3-benzoate, 50 ccs. of phosphorus oxychloride and 3 ccs. of dimethylaniline, 19% of the theoretical yield is obtained.

V. After boiling for 30 minutes a mixture of 50 mgms. of 7-α-hydroxycholesterol-3-benzoate, 50 mgms. of phosphorus oxychloride and a mixture of 2 ccs. of dimethylaniline and 1 cc. of collidine, 35% of the theoretically possible yield is obtained.

VI. 51 mgms. of 7-α-hydroxycholesterol-3-benzoate, 56 mgms. of thionyl chloride, 2 ccs. of dimethylaniline and 1 cc. of collidine are boiled for 5 minutes in nitrogen. The yield of 7-dehydrocholesterol is largely 1%.

VII. 40 mgms. of 7-α-hydroxycholesterol-3- benzoate, 41 mgms. of sulphuryl chloride, 3 ccs. of dimethylaniline and 1 cc. of collidine are boiled for 5 minutes on a piece of wire gauze, while nitrogen is passed over it. The yield of 7-dehydrocholesterol, ascertained as in Example I, is 29%.

VIII. 50 mgms. of 7-α-hydroxycholesterol-3-benzoate, 60 mgms. of phosphorus tribromide, 4 ccs. of dimethylaniline and 1 cc. of collidine are boiled for two hours in a nitrogen atmosphere. It is found that the yield of 7-dehydrocholesterol is 44%.

IX. 24 mgms. of 7-α-hydroxycholesterol-3-stearate, 50 mgms. of phosphorus oxychloride, 1 cc. of collidine and 2 ccs. of dimethylaniline are boiled for 5 minutes under nitrogen. Thus a yield of 7-dehydrocholesterol of 15% is obtained.

What I claim is:

1. A method of preparing a 7-dehydrosterol which comprises subjecting a 7-hydroxysterol-3-monoester to the action of an inorganic acid halide in a tertiary amine while heating the latter to a boiling temperature with the exclusion of oxygen whereby the hydroxyl group at the 7-position is split off and a 7-dehydrosterol ester is formed.

2. A method of preparing a 7-dehydrosterol which comprises the steps of subjecting a 7-hydroxysterol-3-monoester to the action of an inorganic acid oxyhalide in a tertiary amine with the exclusion of oxygen while heating the latter to a boiling temperature whereby the hydroxyl group at the 7-position is split off and a 7-dehydrosterol ester is formed and saponifying the latter to form a 7-dehydrosterol.

3. A method of preparing a 7-dehydrosterol which comprises the steps of subjecting a 7-hydroxysterol-3-monoester to the action of phosphorous tribromide in a tertiary amine with the exclusion of oxygen while heating the latter to a boiling temperature whereby the hydroxyl group is split off at the 7-position and a 7-dehydrosterol ester is formed and saponifying the latter to form a 7-dehydrosterol.

4. A method of preparing a 7-dehydrosterol which comprises the steps of subjecting a 7-hydroxysterol-3-monoester to the action of phosphorous oxychloride in a tertiary amine while heating the latter to a boiling temperature with the exclusion of oxygen whereby the hydroxyl group is split off at the 7-position and a 7-dehydrosterol ester is formed and saponifying the latter to form a 7-dehydrosterol.

5. A method of preparing a 7-dehydrosterol which comprises the steps of subjecting a 7-hydroxysterol-3-monoester to the action of thionyl chloride in a tertiary amine while heating the latter to a boiling temperature with the exclusion of oxygen, whereby the hydroxyl group is split off at the 7-position and a 7-dehydrosterol ester is formed and saponifying the latter to form a 7-dehydrosterol.

JAN ANNE KEVERLING BUISMAN.

REFERENCES CITED

The following references are of record in the file of this patent:

UNITED STATES PATENTS

| Number | Name | Date |
| --- | --- | --- |
| 2,098,984 | Windaus | Nov. 16, 1937 |
| 2,350,485 | Arundale | June 6, 1944 |
| 2,395,232 | Meuly | Feb. 19, 1946 |